UNITED STATES PATENT OFFICE.

HERBERT C. REES, OF SAN ANTONIO, TEXAS.

PROCESS OF FORMING TUBES.

1,375,108.    Specification of Letters Patent.    Patented Apr. 19, 1921.

No Drawing. Application filed October 20, 1919, Serial No. 332,072. Renewed February 1, 1921. Serial No. 441,658.

*To all whom it may concern:*

Be it known that I, HERBERT C. REES, a citizen of the United States, residing at San Antonio, in the county of Bexar and State of Texas, have invented certain new and useful Improvements in Processes of Forming Tubes, of which the following is a specification.

The tubes made according to the following process are especially designed for use in the manufacturing of eye-glasses, spectacles, &c., and in fitting or refitting or repairing of eyeglasses and spectacles of the rimless type especially, but it will of course be understood that the tubes made according to this process may be adapted for other uses than this specific use.

In the following specifications and claims I have set forth the manufacture of the tubes according to the best mode I have so far devised for the practical application of the principles of my invention, the process being utilized in connection with raw-hide or parchment as the material of which the tubes are made. While I shall hereinafter refer to the material, of which the tubes are made, as raw-hide or parchment, I do not desire to limit myself to the use of this material in the process of manufacture of the tubes, as other cellular or similar material may be used.

In the physical embodiment of my invention I take a blank or strip of raw hide, cut the proper size and shape for the resulting tube, and fashioned by any of the usual tools or methods for fashioning such strips or blanks, and first thoroughly soak the blank in water, as by immersion or a bath, permitting the blank to remain in the bath until it has absorbed sufficient of the water to thoroughly moisten it.

While wet or in the moistened condition, the blank is wound or wrapped spirally upon a comparatively large mandrel forming part of a machine adapted for the purpose, and the blank, during its process of winding or wrapping on the mandrel is held taut or slightly under tension in order to wrap tightly the strip on the mandrel with its edges closely abutting or slightly overlapping, as the case may be.

The spirally wrapped, moistened, tube is now radially compressed, a suitable die being used for the purpose and co-acting with the mandrel on which the tube is retained, and the action of the die in compressing the tube results in expelling or eliminating from the material of the tube most of the moisture that had formerly been absorbed by immersion.

The tube is now set, and may then be removed from the initial mandrel, and subsequently is placed upon a smaller mandrel and heated while thereon. Or the tube may be heated before placing on the second mandrel, in either case its temperature is only slightly raised, in order that it may be more susceptible to further treatment.

The warm tube, loose on its smaller or second mandrel, is now subjected to a second compression in a suitable press, or by the use of a die co-acting with the mandrel, and at this time the tube is subjected to both a radial compression and an axial compression, and after such compression the tube is removed from the mandrel.

In this manner the desired diameter of the tube is secured and the body of the tube or material has been compressed or compacted both radially of the tube and longitudinally or axially thereof especially fitting said tube for use in supplying washers for mountings in rimless eyeglasses or spectacles.

During the process of forming the tube, a part of the natural or normal moisture has been pressed out or eliminated from the body of the tube leaving the compressed cells, which although compressed are not ruined and are yet capable of absorbing moisture, forming part of the body or material of the tube. Thus the tube may absorb a normal amount of moisture from the air, or it may be moistened for the purpose of expanding it as required in the manufacture of lens mounts.

It is obvious that tubing may be made according to this method or process and only one size mandrel used, but I have found by actual test and use that when two or more sizes of mandrels are employed in the process of making the tubes better results are had, because when two or more mandrels and dies of different sizes are used, the material is wound under tension on the larger or largest mandrel and then pressed radially, then when subsequently placed on the smaller mandrel or mandrels, both a radial and an axial compression are secured by the die pressure. As a result, a resilient tube is secured which is capable of expanding both radially and axially under action of mechanical means, or such expansion may be secured by the absorption of moisture.

What I claim is—

1. The process of fashioning a tube of compressible material on a mandrel, removing the tube and placing the same on a relatively smaller mandrel, and bodily compressing the material of the tube to conform to the diameter of the smaller mandrel.

2. The process of fashioning a tube of moist material on a mandrel, compressing the tube to express moisture therefrom, removing the tube and placing the same on a comparatively smaller mandrel and bodily reducing the tube to conform to the diameter of the second mandrel.

3. The process of making a tube of cellular material which consists in wrapping a moistened strip of the material on a large mandrel to form a tubular member, placing said tubular member on a smaller mandrel and bodily compressing the tubular member to conform to the diameter of the smaller mandrel.

4. The process of making a tube which consists in spirally winding a moist blank on a mandrel and then compressing the moistened blank to form a tubular member, removing the member and placing it on a smaller mandrel, and bodily compressing the member to conform to the diameter of the smaller mandrel.

5. The process of making a tube which consists in spirally winding a moistened blank on a mandrel, compressing said blank on the mandrel, heating the tubular member thus formed, and finally bodily compressing said tubular member on a smaller mandrel to conform to the diameter of the latter.

HERBERT C. REES.